Dec. 18, 1928.
R. RUDENBERG
1,695,719
OSCILLOGRAPH
Filed Dec. 1, 1925
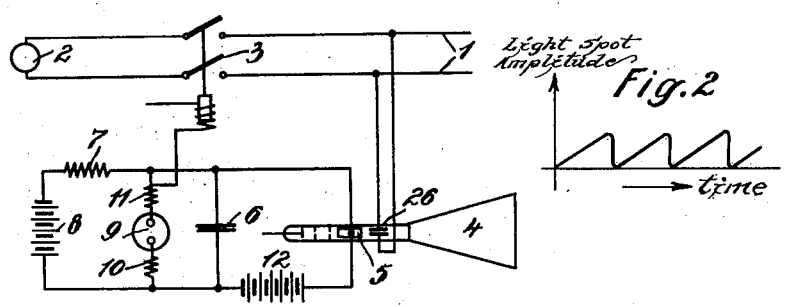
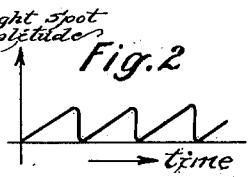
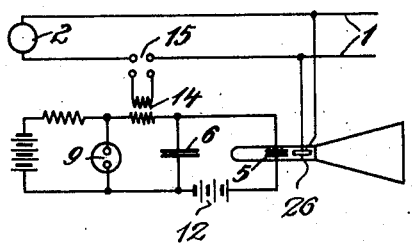
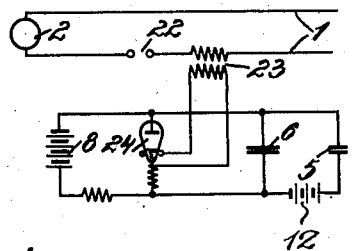
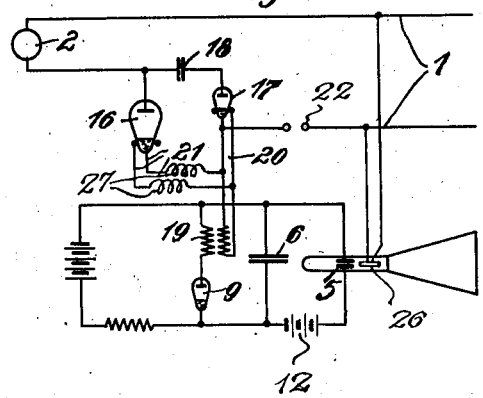
Inventor
Reinhold Rudenberg
by Knight B~ attorneys Patented Dec. 18, 1928.

1,695,719

UNITED STATES PATENT OFFICE.

REINHOLD RÜDENBERG, OF BERLIN-GRUNEWALD, GERMANY, ASSIGNOR TO SIEMENS-SCHUCKERTWERKE GESELLSCHAFT MIT BESCHRÄNKTER HAFTUNG, OF SIEMENSSTADT, NEAR BERLIN, GERMANY, A CORPORATION OF GERMANY.

OSCILLOGRAPH.

Application filed December 1, 1925, Serial No. 72,609, and in Germany December 20, 1924.

My invention relates to an oscillograph for providing a visible indication or permanent record of transient phenomena.

For indicating or recording transient electric phenomena, such as travelling waves and similar oscillations, the electron oscillograph (Braun's tube) is particularly suitable because it contains no moving masses and even the most rapidly passing phenomena are reproduced without distortion. A great drawback resides, however, in the low light intensity which such devices produce if the phenomenon occurs only once. It is therefore advisable to repeat the phenomenon many times in quick succession in order to obtain a stronger light impression in the eye as well as on the photographic plate if a highly transient phenomenon is to be oscillographed. It is therefore necessary to repeat periodically the motion of the spot of light and the phenomena to be examined and to cause both to coincide by skillfully adjusting the apparatus so that the spot of light always traverses the same path.

If it is desired to oscillograph travelling wave phenomena the light intensity is so low, owing to their rapid occurrence, which generally takes place in fractions of a thousandth of a second, that it is necessary to greatly increase the frequency of the repetition of the phenomenon. Thus an accurate coincidence of the control of the spot of light with the phenomena to be measured is very difficult.

The object of my invention is to eliminate these drawbacks. In my improved oscillograph a slow advance or forward movement and a quick return or backward movement is imparted to the light spot and the transient phenomena are according to my invention released by the same cause as brings about the advance or the return of the spot of light. By the common control of the transient phenomena and the advance and return of the spot of light the result is obtained that the transient phenomena always takes place at the same point, for instance of the advance, i. e. in phase with the movements of the light spot, so that the individual phenomena coincide accurately. The control of the spot of light may be effected in the well known manner by slowly charging a condenser which is then quickly discharged across a spark gap. The condenser is furthermore connected with two deflecting plates in the oscillograph either directly or by inductive or capacitive coupling. My invention is by no means confined to electron oscillographs but may be equally well applied to other types of oscillographs.

In the drawing, embodiments of my invention are illustrated diagrammatically.

Fig. 1 of the drawing represents a diagram of my improved arrangement or system applied to an embodiment in which an electron oscillograph is used.

Fig. 2 represents a diagram of the advance and return of the spot of light.

Fig. 3 represents an arrangement for controlling the individual switching operations, Fig. 4 represents another arrangement for the same purpose, and Fig. 5 represents a further arrangement in which the control is effected by means of the transient phenomena themselves.

Referring to Fig. 1 of the drawing 1 is a line into which travelling, transient waves are released by the connection of the line with the generator 2 by the aid of the switch 3. The control of the cathode ray of the oscillograph tube 4 by the travelling waves is effected by the pair of plates 26. There is furthermore located in the tube a second pair of plates 5 which is displaced in relation to the first pair of plates by an angle of 90°. This second pair of plates effects the advance and return of the spot of light.

This advance and return is shown in a diagram in Fig. 2. The abscissa is the time, the ordinate the advance of the spot of light from a fixed zero point. As the diagram shows the advance takes place slowly while the return takes place almost instantly. In order to control the spot of light in this manner the plates 5 are connected with a condenser 6. This condenser is gradually charged, for instance by a source of direct current 8, through a resistance 7. The plates 5 thus produce the slow advance of the spot of light. When the voltage at the condenser has attained a certain value, a quick discharge takes place across the spark gap 9 and thus a quick return of the spot of light occurs.

As spark gap, an ordinary blow-out spark gap, for instance between balls in atmospheric air, may be used. Any other gases under high or low pressure may, however, be employed as an atmosphere for the gap, such as spark gaps in rare gases, mercury vapor vacuum spark gaps, dimmer lamps, blow-out spark gaps with hydrogen cooling and others. In order to cause the discharge across the spark gap to drop as quickly as possible, a resistance 10 is connected in series with it. The spark gap is furthermore coupled with the switch 3 by the aid of a relay 11 in such a manner that the switch 3 is closed immediately after the spark discharge.

The arrangement or system operates in the following manner: When the source of direct current 8 is switched on the condenser 6 is charged slowly. When its voltage has reached a certain value, a quick discharge takes places across the spark gap 9 and in conjunction therewith again a slow charging according to the diagram in Fig. 2 of the drawings. This discharge and charge continues automatically, and thus the spot of light in the tube 4 is correspondingly controlled by the deflecting plates 5. By the spark discharge the switch 3 is also closed by means of the relay 11 at the beginning of the charge and thereby a travelling wave phenomenon or impulse is released upon the line 1. These travelling waves then influence the ray of light through the pair of plates 26 at right angles to the direction of the advance and the return. Since the travelling wave phenomenon always develops at the same place of each advance of the light spot, the individual paths of the spots of light coincide and a clear picture of the path of the travelling waves is formed.

In order to adjust the spot of light correctly upon the desired zero axis the voltage of the deflecting plates 5 may be displaced in relation to the voltage of the condenser 6 by an auxiliary, preferably adjustable voltage produced by source 12. The zero position of the light spot is then not located at one side, as shown in Fig. 2, but would be between, and preferably midway between the extreme points of its total amplitude. The displacement of the zero axis may also be effected by coupling the plates 5 with the condenser 6 by a transformer which suppresses the direct current voltage component of the condenser. Such a transformer has the further advantage that it is possible to work with high voltage at the condenser and the park gap, but at the deflecting plates with a low voltage. A high condenser voltage produces a greater regularity of sparking. It is, however, also possible to couple the condenser 6 capacitatively with the plates 5, for instance by connecting an electrostatic voltage divider in the circuit.

The release of the traveling waves by the switch 3 may also be effected by the condenser 6 in such a manner that the switch 3 is operated by means of a suitable relay at any desired value of the condenser voltage or the condenser current.

Instead of releasing the variable phenomena by the spark discharge or charging of the condenser, it is also possible to release the charge of the condenser by the transient phenomenon.

A great advantage of the improved arrangement consists in the feature that it is no longer necessary to especially observe whether the transient phenomena are repeated exactly on time, i. e. in synchronism with the light spot movement, because Fig. 2 of the drawing shows that it is not necessary that the individual charging periods of the condenser should last exactly the same time. It is only essential that the charging periods set in at equal intervals and on time. This rate of charging is given by the constant product of the value of the resistance 7 and the capacity of the condenser 6 (r. C). The curve of the spot of light remains always in the same place so long as the control is such that the travelling waves always commence timely at the same point of the curve reckoned from the commencement of the charging of the condenser.

In very rapidly passing transient phenomena the frequency of the switching operations should preferably be chosen very high. The switch 3 employed in Fig. 1 of the drawing with large inert masses does here no longer prove satisfactory. In this case it is preferable to effect the release of the travelling wave phenomena by circuit control means having no inertia. This may be attained for instance by ionizing an air gap, normally blocking the path of the wave. Such an arrangement is illustrated in Fig. 3 of the drawings. The discharge of the condenser 6 across the spark gap 9 generates in the secondary coil of a transformer 14 a corresponding pressure which manifests itself at the ball spark gap 15 by a spark. The generator 2 is in this case, as in Fig. 1 of the drawing, connected with the line 1 and sends forth a travelling wave phenomenon as soon as the ionization of the gap by the spark has established the proper bridge.

In the embodiment of my invention illustrated in Fig. 4 of the drawing mercury vapor tubes are employed for releasing the travelling wave. These tubes are ignited by a suitable ignition voltage in a well known manner. The connection of the line 1 with the generator 2 is effected by the aid of the two switching tubes 16 and 17. The tube 17 is connected in multiple with the tube 16 through a condenser 18. The ignition of these tubes takes place by the discharge current of the tube gap 9 through a transformer 19 supplying starting current to the two control lines 20 and 21. In the illustrated arrangement of the two tubes the switching tube 17 is at first assumed to be inoperative owing to the insufficient voltage existing when current is passing through the tube 16. The condenser 18 is then charged. If the tube 17 is, however, supplied with a sufficient ignition voltage through the transformer 19, it is temporarily connected into circuit. The line 21 is designed as retarding line, for instance, by inserting choke coils 27 into it, so that the ignition impulse from the transformer 19 arrives at the tube 16 later than at the tube 17. The switching operations take place in the following manner. During the charging of the condenser 6 the tube 16 is assumed to be connected in circuit. If now the condenser 6 is discharged through the tube gap 9, the mercury vapor tube 17 is ignited through the transformer 19. The discharge of the condenser 18 then sends a current through the tube 16 in the opposite direction to the current already flowing in the tube. This causes the tube 16 to be extinguished for the time being. At the next moment the ignition impulse from the transformer 19 arrives across the retarding line 21, the tube 16 is again ignited and connected in circuit and another travelling wave released thereby. Simultaneously the fresh charging of the condenser 6 and thus the slow advance of the spot of light in the oscillograph has commenced. Then condenser 6 is again discharged through tube 9 and the cycle described commences anew. With such a system or arrangement the device may be so tuned, even if all operations take place at a rapid speed, that the discharge of the condenser 6 takes over the control in the tube gap 9 and delays in the ignition of the tube 16 occur to such an extent that the release of the travelling waves on the line 1 takes place only when the condenser 6 has discharged itself, if necessary with a few oscillations. It will be readily understood that the various operations in the switching tubes 16 and 17 may equally well be controlled by other means than the transformer 19.

In the embodiment of my invention illustrated in Fig. 5 of the drawing the various operations in the taking of the oscillogram are not controlled by the spark discharge of the condenser 6, but by the transient phenomena themselves. The generator 2 is connected with the line 1 through a spark gap 22. The spark gap is so dimensioned that when working with alternating current, for instance, it responds once in each half cycle and thereby releases a travelling wave phenomenon. The response of the spark gap 22 is through the agency of a transformer 23 utilized to ignite a mercury vapor tube 24 in the circuit of the condenser 6 which tube here takes over the function performed by the spark gap 9 in the preceding arrangements or systems. The condenser 6 discharges and is then immediately charged again by the source of current 8. If the discharge period of the condenser 6 is sufficiently short, as may easily be attained by suitably proportioning the condenser circuit, its charging commences synchronously with the travelling wave phenomena upon the line 1 so that the commencement of the phenomena is also covered by the oscillograph.

Various modifications and changes may be made without departing from the spirit and the scope of my invention, and I desire, therefore, that the appended claims shall be accorded the broadest interpretation commensurate with the language thereof, when read in the light of the prior art.

I claim as my invention:—

1. An oscillograph for observing transient phenomena having means for slowly advancing and quickly returning the light spot, means for releasing the transient phenomena and means for jointly controlling the light spot movement and said releasing means.

2. An oscillograph for observing transient phenomena having means for slowly advancing and quickly returning the light spot, means for releasing the transient phenomena and a condenser for jointly controlling the light spot movement and said releasing means.

3. An oscillograph for observing transient phenomena having a condenser circuit and means for charging and discharging said condenser to bring about a slow advance and quick return of the light spot and relays actuated by the condenser discharge in said circuit for releasing said phenomena in synchronism with the movement of said light spot.

4. In an oscillograph for observing transient phenomena means for slowly advancing and quickly returning the light beam comprising deflecting plates disposed on either side of the beam, a condenser connected to said plates, means for slowly charging and means for quickly discharging said condenser to slowly advance and quickly return the light beam and a source of biasing potential connected in circuit with said plates and said condenser for placing the zero position of the light beam between the extreme points of its amplitude.

5. An oscillograph for observing transient phenomena having a condenser circuit, means for slowly charging the condenser therein and a timing spark gap connected in parallel to said condenser for quickly discharging it to slowly advance and quickly return the oscillograph light spot, and means connected with said spark gap for releasing the transient phenomena to be observed to obtain synchonism between the occurrence of said phenomena and the cyclic movements of said light spot.

6. An oscillograph for observing transient phenomena having a condenser circuit, means for slowly charging the condenser therein and a spark gap connected in parallel to said condenser for quickly discharging it to slowly advance and quickly return the oscillograph light spot, means for generating transient wave phenomena, vapor tubes for controlling the release of said phenomena and circuit connections between said vapor tubes and said gap for controlling said tubes in dependance of the gap operation to synchronize the controlling function of said tubes with the operation of said gap.

7. An oscillograph for observing transient phenomena having a condenser circuit, means for slowly charging a condenser therein and a timing spark gap connected in parallel to said condenser for quickly discharging it to slowly advance and quickly return the oscillograph light spot, a transformer having its primary winding connected in circuit with said gap and means connected in circuit with the secondary transformer winding for releasing the transient phenomena to be observed, to obtain synchronism between the occurrence of said phenomena and the cyclic movement of said light spot.

8. An oscillograph for observing transient phenomena having a condenser circuit, means for slowly charging the condenser therein and a timing spark gap connected in parallel to said condenser for quickly discharging it to slowly advance and quickly return the oscillograph light spot, a line circuit in which the transient phenomena are produced, a main spark gap in said circuit for releasing said phenomena into the line, and circuit connections between said timing spark gap and the main gap circuit for actuating the main gap in accordance with the operation of said timing gap for synchronizing the occurrence of said penomena and the cyclic movements of said light spot.

9. In an oscillograph for observing transient phenomena, a circuit for carrying the transient phenomena, a main spark gap in said circuit for releasing said phenomena, vapor tubes in said circuit for controlling the release of said phenomena, a condenser circuit, means for slowly charging the condenser therein and a timing spark gap connected in parallel to said condenser for quickly discharging it to slowly advance and quickly return the oscillograph light spot, a transformer having its primary winding connected in circuit with said timing gap and means connected in circuit with the secondary transformer winding and said vapor tubes for initiating the release of the transient phenomena to be observed, to obtain synchronism between the occurrence of said phenomena and the cyclic movement of said light spot.

10. In an oscillograph for observing transient phenomena, a circuit for carrying the transient phenomena, a main spark gap in said circuit for releasing said phenomena, two mercury vapor tubes having their anodes connected by an auxiliary condenser and being connected in parallel into the circuit carrying said phenomena for controlling the release thereof, a condenser circuit, means for slowly charging the condenser therein and a timing spark gap connected in parallel to said condenser for quickly discharging it, to slowly advance and quickly return the oscillograph light spot, and circuit connections between said tubes and said timing spark gap for causing the ignition of said tubes in accordance with the operation of said timing gap for synchronizing the occurrence of said phenomena and the cyclic movements of said light spot.

11. In an oscillograph for observing transient phenomena, a circuit for carrying the transient phenomena, a main spark gap in said circuit for releasing said phenomena, two mercury vapor tubes having their anodes connected by an auxiliary condenser and being connected in parallel into the circuit carrying said phenomena for controlling the release thereof, a condenser circuit, means for slowly charging the condenser therein and a timing spark gap connected in parallel to said condenser for quickly discharging it, to slowly advance and quickly return the oscillograph light spot, and circuit connections between said tubes and said timing spark gap for causing the ignition of said tubes in accordance with the operation of said timing gap for synchronizing the occurrence of said phenomena and the cyclic movements of said light spot, one of said timing gap-tube connections containing current retarding means to delay the actuation of the pertaining tube over the actuation of the other tube by said timing gap.

In testimony whereof I affix my signature.

REINHOLD RÜDENBERG.